United States Patent Office 2,946,383
Patented July 26, 1960

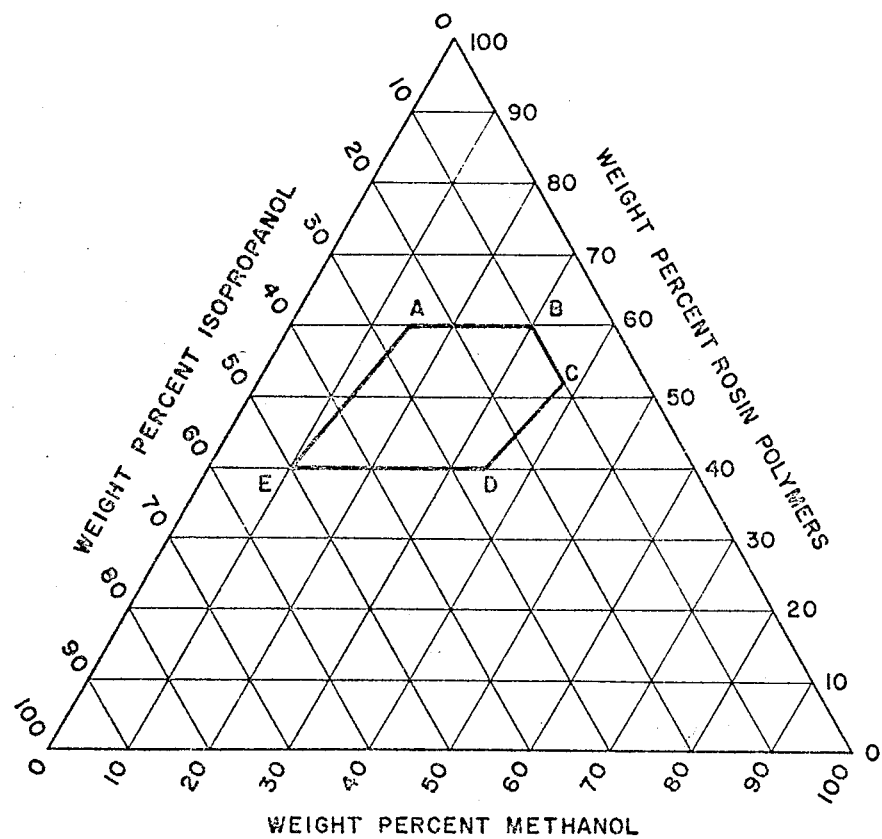

2,946,383
SHUTTING OFF WATER IN WELLS

William G. Bearden, Robert P. Murphy, Jr., and Platho P. Scott, Jr., Tulsa, Okla., assignors to Pan American Petroleum Corporation, a corporation of Delaware Filed Dec. 28, 1956, Ser. No. 631,277

6 Claims. (Cl. 166—33)

This invention relates to a method for shutting off water entering wells. More particularly, it relates to shutting off water entering oil wells penetrating formations producing both oil and water.

One method for shutting off water is described in U.S. Patent 2,032,826, Ambrose et al. This patent teaches, in general, dissolving an oil-soluble, water-insoluble material in alcohol and injecting the solution into the water producing formation. In the formation, the alcohol solution is diluted by water which causes precipitation of part of the water-insoluble material. This precipitate tends to plug the water-bearing zone. If the solution enters an oil-bearing formation no harm is done for two reasons. First, there is little water present to dilute the alcohol solution and form a precipitate. Second, any precipitate which does form, rapidly dissolves in the oil.

Efforts to develop the Ambrose et al. technique have shown that the method operates very much as the inventors propose. That is, when a solution of naphthalene in methanol is forced into a water-bearing formation, mixing of water with the alcohol solution does occur, a precipitate is formed and the permeability of the water-bearing formation is decreased. The principal difficulties arise from two causes. First, the degree of the permeability decrease is small. This is due to the low solubility in alcohols of the plugging materials suggested by Ambrose et al. No great amount can be precipitated from the dilute alcohol solutions. As a result, it is difficult to obtain more than about a 50 percent reduction in permeability of most formations by use of a single treatment with one of the solutions suggested by Ambrose et al. The second difficulty with the Ambrose et al. method is that some of the materials, such as naphthalene and stearic acid, have a slight water solubility. Therefore, they are slowly dissolved in the water and removed from the formation in the many weeks, months, or even years during which an oil well is normally produced.

If more alcohol-soluble and less water-soluble materials such as wood rosin are used in place of the naphthalene, stearic acid, and the like of Ambrose, somewhat better results can be produced. Sometimes as much as 70 percent reduction in permeability can be obtained by treatment with reasonable quantities of plugging solutions. Such reduction in permeability is somewhat useful in shallow wells which produce little water. Such wells, however, do not present any great problem. The principal problem arises in wells which produce such a large volume of water that several thousand feet of water may stand in the hole. If such wells are treated with alcohol solutions of wood rosin, for example, a decrease of 60 or 70 percent in the permeability of the water formations may be produced. It will be apparent that less water would be produced through such a plugged formation if the same pressure differential was maintained between the formation and the bottom of the well. What actually happens, however, is that the level of liquid in the well is simply decreased until the pressure drop between the formation and the bottom of the hole is sufficient to cause production of the same amount of water as before—the capacity of the pumping equipment available. Under such circumstances, in order to obtain any considerable benefit from the plugging optration, the permeability of the formation must be reduced by at least 90 percent and preferably much more.

An object of this invention is to provide a plugging material and a plugging solution which, upon injection into a water-bearing formation, will produce a large permanent decrease in permeability. Other objects will be apparent from the following description.

We have found that our objects can be attained by injecting into the water-producing formation a solution of a certain type of rosin polymers in a water miscible solvent. The polymers are preferably produced by the sulfuric acid polymerization of rosin dissolved in a solvent such as gasoline, benzene, carbon tetrachloride, or the like. The polymers and the method by which they are produced are described in more detail in U.S. Patents 2,017,866, Morton; 2,108,928, Rummelsburg; and 2,136,525, Rummelsburg. The polymerization should be carried to such an extent that the average molecular weight of the resulting polymers is at least about 450 as measured in acetone and the melting point, or more properly, the softening point, is at least about 100° C. by the ASTM ball and ring method. Preferably the molecular weight should be about 500 and the softening point about 140° C. The higher softening point is, of course, highly important in treating formations having high temperatures.

The desired polymers may be produced in a single step of polymerization using long reaction times of 5 or 6 hours, high sulfuric acid concentrations of about 80 percent, in amounts equal to about 20 percent by weight of the rosin, and high reaction temperatures of about 50° C. Preferably, however, the polymerization should be carried out under much milder conditions to produce a smaller degree of polymerization with correspondingly decreased decomposition, isomerization, disproportionation, oxidation, and the like. The desired average molecular weight and softening point can then be produced by separation of at least part of the monomers away from the polymers. This separation may be accomplished by vacuum distillation, for example.

The polymers will generally contain some monomers as well as some rosin oils and the like. The term "rosin polymers" is intended to include this entire mixture of materials. Thus, when the average molecular weight and softening point of the rosin polymers are said to be 500 and 140° C., respectively, these values apply to the entire mixture and not to just the polymers present in the mixture. Likewise, when a rosin polymers concentration of 50 percent is mentioned, for example, the 50 percent refers to the concentration of the entire mixture of polymers, monomers, oils, and the like.

The solvent employed may be any liquid which is a good solvent for the rosin polymers, is oil-soluble, and is miscible in all proportions with water. The solvent should be able to form solutions of the polymers containing at least about 40 percent by weight of the polymers. This is because solutions containing smaller concentrations of the polymers do not form sufficiently effective plugs in water zones. An effective plug should produce at least 90 percent reduction in permeability of the water-bearing zones. Solutions containing up to 60 percent by weight of the polymers may be used in some cases. Such solutions, however, are very viscous and are difficult to pump into formations, particularly those having relatively low initial permeability. If such solutions are used, obviously the solvent must be capable of dissolving sufficient rosin polymer to form solutions containing up to about 60 percent by weight of the polymers.

The solvent must be oil-soluble so that it will be dissolved by oil flowing to the well and thus be removed from the formation. Otherwise, a permanent emulsion might be formed. For purposes of our process, the solvent should have a solubility of at least about 1 part of the solvent in about 10 parts of oil. A greater degree of solubility is desirable, and complete miscibility in all proportions is preferred.

Water and the solvent should be completely miscible in all proportions to insure that there will be no limit on the degree of dilution of the rosin polymer solution by water in the formation. Otherwise, the degree of precipitation of polymers from the solution might be undesirably limited.

The two specific solvents which have been found to be most suitable for our purposes are methanol and isopropanol. Methanol is the least expensive and forms concentrated solutions having somewhat lower viscosities than solutions of rosin polymers in other solvents such as isopropanol. However, methanol solutions are frequently turbid due to the presence of undissolved solids. This is particularly true for solutions containing less than about 50 percent by weight of the rosin polymers. In addition, methanol solutions are very sensitive to water. That is, small amounts of water cause precipitation of some of the polymers. In most cases, a little turbidity of the solution due to undissolved or precipitated solids is not objectionable. However, such solids do tend to plug the pores of formations, decreasing their permeability, and increasing the difficulty of injecting the water shut-off solutions into the formations.

Isopropanol generally forms clear solutions of rosin polymers even at low concentrations of the polymers. In addition, isopropanol solutions are not so sensitive to small amounts of water. About 10 percent water can be added to isopropanol solutions of rosin polymers before precipitation of the polymers begins. However, the isopropanol solutions are considerably more viscous than solutions of the polymers in methanol and are, for this reason, more difficult to inject into formations.

A preferred water shut-off composition is shown in Figure 1. In this figure, compositions above line AB have viscosities above those normally considered advisable to inject. Use of such solutions becomes impractical since they must be injected very slowly to avoid hydraulic fracturing of the formations with subsequent loss of much of the treating solution to the fracture. A viscosity of about 100 centipoises should not generally be exceeded. It is true that the treating solution will almost always seal the fracture, just as it will generally seal small fractures initially present. However, loss of large volumes of solution to fractures results in smaller volume treatments of unfractured zones with consequent shallow penetration and less effective water shut-off. For these reasons the concentration of rosin polymers should not exceed about 60 percent by weight as represented by line AB.

Line BC represents a concentration of 10 percent by weight of isopropanol. This is to insure at least some tolerance for water before the rosin polymer precipitates. By use of at least this amount of isopropanol the solution can be injected far into the formation before enough water mixes into the solution to initiate precipitation of the rosin polymers. Thus, quick precipitation with consequent early decrease in permeability, and more difficult injection, is avoided.

Compositions to the right of line CD are relatively undesirable compared to those to the left of the line because they contain at least small amounts of undissolved solids. Such solids tend to plug formations near the well bore during the injection of water shut-off solutions and increase the difficulty of displacing the viscous solutions into the formations. It will be noted that the difficulties encountered when using solution compositions to the right of both lines BC and CD are substantially the same. That is, either precipitated or undissolved solids produce a premature plugging action. Many formations are sufficiently permeable to take injection of treating solutions containing small amounts of finely divided solids. Therefore, solutions to the right of lines BC and CD are operable for many purposes. As a practical matter, however, the permeability of a formation is rarely known with certainty and most formations vary considerably in permeability from top to bottom. Therefore, in order to insure good penetration of all formations, it is best to use only compositions to the left of lines BC and CD.

Line DE represents 40 percent by weight of rosin polymers. At least this minimum amount of the polymers should be present to insure at least about 90 percent reduction in permeability of treated water formations.

Compositions to the left of line EA contain little methanol. In order to obtain an appreciable reduction in viscosities of water shut-off solutions at least about 10 percent methanol should be present. At high concentrations of rosin polymers the minimum concentration of methanol should be increased as shown in the figure. It is true that compositions to the left of line EA can be used in many cases. The increased viscosities of such solutions, however, increases the difficulty of injecting them into formations and increases the danger of fracturing formations. Therefore, only compositions to the right of line EA should generally be used. From an economic standpoint as well as for technical reasons it will usually be desirable to use compositions far to the right of line EA. That is, those containing at least 25 or 30 percent methanol. A preferred composition contains 32 percent methanol, 23 percent isopropanol, and 45 percent rosin polymers, all percentages being by weight.

It should not be concluded from the above comments that moderately high viscosities are undersirable. One of the advantages of our treating solution is that it does have a fairly viscosity. This means that the treating solution is very efficient in displacing water ahead of it during the injection step due to the low viscosity of the water. This avoids excessive mixing of water and treating solution. This in turn decreases any plugging action while injecting the solution. On the other hand, the high viscosity of the treating solution increases the tendency of the low viscosity water to penetrate and mix with the solution when the direction of flow is reversed.

Alcohols other than methanol and isopropanol can also be used. For example, the rosin polymers dissolve in ethanol to form solutions having visosities in the range between similar solutions in isopropanol and methanol. Ethanol is somewhat less desirable than methanol and isopropanol for three reasons. First, commercial ethanol contains at least about 5 percent water. This leads to poor solubility of some of the rosin polymers. Therefore, the solutions of the rosin polymers in commercial ethanol are likely to contain even more solids than methanol solutions and also are usually more water sensitive. Second, commerical ethanol usually contains denaturants which may be objectionable in our process. In addition, ethanol is subject to close governmental regulations which may greatly complicate use of the material. Third, commercial ethanol is much more expensive than methanol and is generally somewhat more expensive than isopropanol. While ethanol is operable as a solvent in our process, its use is not preferred for the above reasons. Other alcohols such as normal propanol, tertiary butanol, the monomethyl ether of ethylene glycol, and the like, are also available which are miscible with water in all proportions, oil-soluble, and are good solvents for rosin polymers. Such alcohols are also operable for our purposes but are not preferred principally because of their higher cost. In addition, they usually form solutions having higher viscosities than those prepared using the lower molecular weight alcohols.

A few non-alcoholic solvents such as acetone and dioxane, can also be used to prepare rosin polymer solutions suitable for our purposes. High water sensitivity, turbidity of solutions of the rosin polymers in such solvents and high cost normally exclude these from the preferred group.

Mixtures of the above solvents with each other can be used if desired. In addition, special solvents, for example, other alcohols such as amyl alcohol, ethers such as diethyl ether, esters such as ethyl acetate, ketones such as methyl ethyl ketone, and the like, which are not completely miscible in all proportions with water, can also be used in small amounts mixed with the completely water-miscible solvents. Such special solvents must be slightly water-soluble and should be used only in amounts which will cause the mixed solvents to be completely water-miscible in all proportions. These special solvents are useful in decreasing water sensitivity of solutions of the rosin polymers in some solvents such as methanol and in clarifying solutions which are turbid due to the presence of undissolved polymers. When the term "consisting essentially of" is used hereinafter in connection with the definition of a composition, the term is intended to include compositions containing, in addition to the principal components, other ingredients such as the solvents described above, in amounts which do not affect the properties of the composition in a manner and to a degree adverse to the intended use of the composition.

Preparation of solutions of the rosin polymers in solvents presents a problem. Normally, when a treating solution includes a solvent such as methanol which is readily available locally, it is customary to mix such a solvent with the solute at the well to save freight charges on shipment of the solvent from the source of the rosin polymers. It has been found, however, that even if the rosin polymers are ground to pass a ½-inch screen, the rate of solution in solvents is slow. For example, 8 to 12 hours may be required to dissolve the rosin polymers in a mixture of methanol and isopropanol by use of a propeller-type stirrer in a tank containing the polymers and solvent. Generally, it is undesirable to tie up equipment at a well for this length of time while performing a mixing operation. The solution rate is increased by heating but this introduces a fire hazard and the advantage is not great until the softening point of the polymers is reached. Since this temperature is far above the boiling point of most of the desirable solvents, pressure equipment, not usually available in the field, is required. It is also possible to ship a primary solution to the field where it can be diluted. Since the concentration of polymers in the desired treating solution is so high, however, and viscosities of more concentrated solutions are extremely high, this has not seemed to be a very practical method.

Although any of the above techniques may be employed to prepare water shut-off solutions in the field, it is generally preferred to prepare the solutions in the manufacturing plant where the rosin polymers are made, or at a central point near fields containing wells to be treated. This solution is then shipped to the well in drums or tank trucks ready for use.

The quantity of solution used depends principally upon the length of exposed formation to be treated. Use of about 50 gallons per foot of exposed formation is recommended. That is, if 10 feet of formation is exposed between depths of 1,000 and 1,010 feet, about 500 gallons of water shut-off solution should usually be injected. The amount should be at least about 10 or 20 gallons per foot of exposed formation to insure an adequate distance of penetration into the formation to produce an effective plugging action. Use of more than about 100 gallons per foot becomes economically prohibitive in view of the small advantage of using such large volumes, over the results produced by volumes less than about 100 gallons per foot. Nevertheless, in some cases use of larger volumes may be justifiable.

Due to the nature of the water shut-off solutions, contamination by water or oil before the solution enters the formation should be avoided. Thus, equipment used for mixing, transporting, or otherwise handling the solution should be substantially water-free and oil-free. This also means that unusual care should be exercised to avoid mixing of the treating solution with either oil or water in the well. Treatment should normally not be attempted down the annulus between the casing and tubing unless the well is first pumped down to a very low level. Usually, this will not be possible in wells producing large volumes of water. Generally, the solution should be introduced down the tubing with a packer or retainer set between the tubing and casing to isolate the treating solution from liquids in the annular space above the zone to be treated. A packer may also be set below the zone to be treated. Other means of isolating limited zones to be treated will occur to those skilled in the art. For example, a liquid may be pumped down the annular space between the tubing and casing while the treating solution is pumped down the tubing. Use of two packers or other means to isolate a zone only 10 or 20 feet long is particularly advisable if a long section of formation is exposed. That is, long sections should preferably be treated about 10 or 20 feet at a time. As previously mentioned, the treating solutions are viscous so the rate of injection should be controlled to avoid developing pressures sufficient to fracture the formation.

During injection of the treating solution into a formation, some mixing with water occurs. As a result, some rosin polymer is precipitated and the permeability of the formation is decreased. An increased difficulty of injecting the solution results. In most cases, the degree of mixing with water during the injection of the solution is small due to the high efficiency of displacement of the low viscosity water by the high viscosity treating solution. If desired, the mixing can be further decreased by injecting ahead of the treating solution an antecedent batch of oil or of one of the rosin polymer solvents such as methanol. This oil or solvent may amount to as much as about 20 or 25 percent of the volume of the treating solution. The volume should not greatly exceed 25 percent of that of the treating solution to avoid an excessive amount of solvent action for the rosin polymers when the direction of flow is reversed.

The treating solution may also be followed into the formation by a small volume or chaser batch of oil. The purpose of the chaser is to displace the treating solution far enough into the formation that it has a chance to be diluted by water before flowing back out of the formation into the well. Here again, the volume should not exceed about 20 or 25 percent of the volume of the treating liquid to avoid serious tendencies to dilute the treating solutions or dissolve precipitated rosin polymers.

The treating procedure may be repeated any number of times if desired, to produce an improved degree of permeability reduction. If the process is repeated, it is usually advisable to allow the well to produce for a few days between treatments to be sure all the rosin polymers have been removed from the oil zone. In this way, all possibilities of forming a permanent plug in the oil zone are avoided.

Our method has been described principally in connection with shutting off water flowing into a well from a formation which also produces oil. Other applications will occur to those skilled in the art. For example, it can be applied to shut off water entering wells being drilled with air as a circulating fluid. In such cases any large amount of water entering the well causes the bit cuttings to become wet and sticky. Thereupon, these cuttings tend to stick together as they are blown up the well, and form balls. These balls usually bridge between the drill pipe and well wall somewhere up the hole and may stick the drilling string in the well. In addition, these sticky masses greatly increase the difficulty of circulating air through the well. Our process can be used to plug off water-producing formations so that drilling can be continued with dry air.

Another specific application of the method is to waterflooding. In this method a large proportion of injected water may enter a highly permeable zone. The result frequently is that water flows readily through this zone from the injection to the producing well, bypassing most of the oil in less permeable zones. Our method can be used to plug the more permeable zones to a greater degree than the less permeable ones, and thus decrease the degree of bypassing which would otherwise occur. The method in this case is identical to that applied to a water-producing formation except that there is no back-flow step.

The method can also be used to plug water-bearing gas zones. If gas zones do not contain sufficient water to form an effective plug, some water can be injected ahead of the treating solution.

From the above description of possible applications of our method, it will be apparent that the terms "water-bearing zone" and "water-bearing formation" used herein should be interpreted broadly. They include formations producing water into a well either in the presence or absence of oil or gas. They also include formations and zones into which water is injected from the well.

Our invention will be better understood by consideration of the following examples.

*Example 1*

The plugging abilities of various materials were tested by the following procedure. Cores about 1⅞ inches in diameter and about 40 inches long were cut parallel to the bedding planes from the Torpedo sandstone where it outcrops near Tulsa, Oklahoma. These cores were sealed in metal pipes with Woods metal or similar sealing agents. Pressure taps were provided every 6 to 12 inches for observation of fluid penetration and pressure distribution within the core. The cores were then saturated with brine containing 3 percent sodium chloride by injecting the brine into one end of the core while applying a vacuum to the other end. The permeability to flow of the brine was determined when the core was saturated with the brine. The plugging solution was injected in a direction opposite to the direction in which the brine was injected to simulate as closely as possible the conditions when treating a formation producing water into a well. Rates of injection and pressures were recorded to determine the degree of precipitation during injection. When the desired penetration was attained, the brine was again injected from the same direction as before. This flow was maintained until stabilized conditions were noted. The final permeability was then determined to permit calculation of the percent reduction in permeability in the invaded zone. Results of the tests are presented in Table 1.

TABLE 1

| Plugging Agent | Solvent | Agent Conc., Wt. Percent Solution | Permeability | | |
|---|---|---|---|---|---|
| | | | Original | Final | Percent Reduction |
| Naphthalene | Methanol | ¹5.1 | 452 | 232 | 48.7 |
| Abietic Acid | ---do--- | 50.5 | 69 | 26.8 | 61.2 |
| Polypale | ---do--- | 45.3 | 198 | 98 | 50.5 |
| Dymerex | ---do--- | 41.5 | 156.5 | 11.4 | 92.7 |

¹ Saturated Solution.

The results of the test using naphthalene are typical for the materials described in 2,032,826, Ambrose et al. In spite of the very low solubility of naphthalene in the alcohol, a decrease of almost 50 percent in the permeability of the treated core was obtained. The final permeability was measured after 2,000 ml. of water had passed through the core after treatment. This final permeability was, of course, slowly increasing due to the solubility of the naphthalene in water. The results obtained using rosin show that by using higher concentrations than are possible with materials such as naphthalene or stearic acid, slightly better plugging can be obtained. The rosin plugs are also superior to naphthalene or stearic acid in their permanence. Unlike naphthalene and stearic acid, rosin is almost completely water insoluble. Polypale resin is a sulfuric acid polymerized rosin carried to a molecular weight slightly greater than raw rosin and to a softening point of about 95° C. The reuslts of the test show that this degree of polymerization is insufficient to give the desired degree of water shut-off. Dymerex is rosin polymer carried to a degree of polymerization similar to Polypale and then subjected to vacuum distillation to strip out sufficient monomers to raise the average molecular weight to about 500 and the softening point (ASTM ball and ring) to about 140° C. Obviously, this material is greatly superior to the other plugging agents and produces the 90 percent plugging action required for good water shut-off even at treating solution concentrations only slightly above 40 percent by weight.

EXAMPLE 2

Results of tests using the lowest cost solvents, methanol and isopropanol, together with the preferred mixture of these two solvents, are presented in Table 2. These tests were run using the apparatus and method described in Example I.

TABLE 2

| Solvent | Dymerex Conc., Wt. Percent Solution | Permeability | | |
|---|---|---|---|---|
| | | Original | Final | Percent Reduction |
| Methanol | 35.6 | 71.8 | 21.3 | 70.3 |
| Methanol | 41 | 156.5 | 11.4 | 92.7 |
| Isopropanol | 43.3 | 275 | 5.4 | 98.0 |
| 32% Methanol 23% Isopropanol | 45 | 204.5 | 2.77 | 98.6 |

The test using a concentration on only 35.6 percent Dymerex in methanol is included to show that at concentrations very much below about 40 percent by weight the polymerized rosins do not produce the desired degree of plugging even though they are somewhat superior to prior art materials. The improved plugging action of the isopropanol solution is probably due mostly to the high viscosity of the solution. This viscosity was about 31 centipoises as measured at about 78° F. by a Stormer viscosimeter rotating at about 600 r.p.m. After the treating agent was placed in the core and backflow of water was started, the low viscosity water apparently readily penetrated and mixed with the viscous treating solution rather than displacing the treating solution from the core. The isopropanol solution was somewhat difficult to inject into the core because of its high viscosity. The methanol solutions were very turbid due to the presence of undissolved solids. For this reason they were also difficult to inject into the cores. In addition, the highly water sensitive nature of the methanol solutions caused some premature precipitation of solids during injection of the solutions to increase the difficulty of injecting the solutions. The solution of the rosin polymers in the mixed solvent, however, was injected relatively easily since it was a clear solution, was not highly water sensitive and had a lower viscosity than the isopropanol solution, i.e., 12.5 centipoises. The plugging action provided by this preferred treating solution obviously was very good.

Example III

Viscosities of some solutions of rosin polymers in methanol, isopropanol, and mixtures of these solvents are presented in Table 3. All viscosities were measured at about 78° F. using either a Stormer viscosimeter rotating at about 600 r.p.m. or an Ostwald viscosimeter used in accordance with ASTM method D-445.

TABLE 3

*Viscosities of solutions at concentrations given, cpse.*

| Solvent | Dymerex Concentration, Wt. Percent Solution | | | | |
|---|---|---|---|---|---|
| | 40 | 45 | 50 | 55 | 60 |
| Methanol | 5.8 | 9.3 | 15 | 28 | 50 |
| Isopropanol | 21 | 39 | 80 | 160 | 330 |
| 32 Methanol / 23 Isopropanol | | 12.5 | | | |
| 32 Methanol / 18 Isopropanol | | | 21 | | |
| 32 Methanol / 13 Isopropanol | | | | 36 | |
| 32 Methanol / 8 Isopropanol | | | | | 77 |

The wide difference in viscosity between methanol and isopropanol solutions is apparent from Table 3. It will be noted that the viscosity of a 60 percent solution of rosin polymers in isopropanol is considerably above the upper limit of about 100 centipoises which should be observed. Isopropanol solutions containing between about 50 and 60 percent rosin polymers in isopropanol should be used only if very highly permeable formations are present and even then caution should be employed to avoid fracturing of the formations. The viscosity reducing effects of methanol are apparent and explain the presence of at least 10 percent methanol in the preferred compositions shown in Figure 1.

Example IV

Water sensitivities of rosin polymers in methanol, isopropanol, and mixed solvents are shown in Table 4. All determinations were made by measuring small amounts of water from a burette into the soltuions until the solutions became turbid. In the case of methanol solutions the alcohol was carefully dehydrated before the tests.

TABLE 4

| Solvent | Dymerex Conc., Wt. Percent Solution | Maximum Water Tolerance, Percent By Volume |
|---|---|---|
| Methanol | 45 | 0.2 |
| 32% Methanol / 23% Isopropanol | 45 | 4.0 |
| Isopropanol | 45 | 10.0 |

Most commercial methanol contains a little water. The extremely low water tolerance of methanol solutions explains why solutions of rosin polymers in most commercial methanol are at least slightly turbid. The ideal water tolerance of the rosin polymers in mixed methanol and isopropanol is apparent. The water tolerance is high enough to avoid premature precipitation of solids during the injection of the solution into a formation but is low enough to cause ready precipitation of solids when the solution is diluted by backflow of water when the well is produced after treatment.

Example V

The plugging action of our treating solution on oil-bearing zones was tested by the apparatus described in Example I. The method differed from that in Example I only in that after saturating the core and measuring the permeability to water, kerosene was injected through the core until a constant flow rate was obtained. After injection of the treating solution, kerosene was again injected at a constant differential pressure across the core to determine the degree of plugging and whether the plug could be cleared from the formation. The original permeability of the core was 195 millidarcys as determined by the flow of brine. The results of the tests are represented in Table 5.

TABLE 5

Dymerex conc., wt. percent solution (in methanol) _ 45
Flow rates of oil (cc./min.):
  Original _____ 7.0
  Immediately after treatment _____ 1.6
  After flowing 120 cc. kerosene _____ 3.0
  After flowing 300 cc. kerosene _____ 4.3
  After flowing 600 cc. kerosene _____ 5.5
  After flowing 1160 cc. kerosene _____ 6.6
  After flowing 2316 cc. kerosene _____ 12.0

The ability of the water normally present in an oil zone to cause considerable plugging of the oil zone is apparent. It will also be obvious, however, that the plug is quickly removed as the oil dissolves the precipitated solid. The reason why the kerosene flow rate after treatment was higher than before treatment was that the viscous treating solution displaced some water from the core. While the same action takes place to some extent in treating a formation penetrated by a well, there is a tendency for the displaced water to flow back toward the well after the treatment. Therefore, any improvement in flow from the oil-bearing zones will ordinarily be of a temporary nature. A small permanent increase in oil flow rates may be obtained, however.

It will be apparent from the above description and examples that we have provided a composition and method capable of effectively shutting off water entering a well from a water-producing formation. The composition and method are useful in cases where no oil producing zones are present, as in drilling through water-producing formations while using air or gas as a drilling fluid. The process is, obviously, particularly applicable to shutting off water produced from zones in formations which also produce oil since the composition and method do not permanently plug oil-producing zones and sometimes actually increase oil production.

We claim:

1. A method for plugging a water-bearing formation penetrated by a well comprising injecting into said well and then into said formation a treating solution containing from about 40 to about 60 percent by weight of rosin polymers having an average molecular weight of at least about 450 and a softening point of at least about 100° C., in an oil-soluble solvent for said rosin polymers, said solvent being miscible in all proportions with water.

2. The method of claim 1 in which said solvent is a saturated aliphatic alcohol containing from 1 to 3 carbon atoms per molecule.

3. The method of claim 1 in which said rosin polymers are produced by the mild sulfuric acid polymerization of rosin followed by vacuum distillation to remove at least part of the monomers.

4. The method of claim 1 in which a batch of oil is injected into the formation ahead of said treating solution to avoid premature mixing of the treating solution with water.

5. A treating solution suitable for shutting off water in a water producing formation, said solution consisting essentially of methanol, isopropanol, and rosin polymers having an average molecular weight of at least about 450 and a softening point of at least about 100° C., said methanol, isopropanol and rosin polymers being present in the relative percentages by weight lying within the area defined in the accompanying diagram by the lines AB, BC, CD, DE, and EA.

6. The method of claim 1 in which said solution is the solution claimed in claim 5.

References Cited in the file of this patent

UNITED STATES PATENTS

| | | |
|---|---|---|
| 2,017,866 | Morton | Oct. 22, 1935 |
| 2,032,826 | Ambrose | Mar. 3, 1936 |
| 2,108,928 | Rummelsburg | Feb. 22, 1938 |
| 2,136,525 | Rummelsburg | Nov. 15, 1938 |
| 2,152,307 | Grebe | Mar. 28, 1939 |
| 2,348,484 | Lawton | May 9, 1944 |
| 2,747,671 | Nowak et al. | May 29, 1956 |